United States Patent

Okada et al.

Patent Number: 6,081,688
Date of Patent: *Jun. 27, 2000

[54] BOTH-FACE AUTOMATIC ORIGINAL FEEDING APPARATUS

[75] Inventors: Tamotsu Okada, Kawasaki; Hiroyoshi Maruyama, Yokohama; Yasumi Yoshida, Yokohama; Masahiko Yashiro, Yokohama; Kazuo Shishido, Yokohama; Noriaki Koyanagi, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/925,138

[22] Filed: Sep. 8, 1997

Related U.S. Application Data

[63] Continuation of application No. 08/800,761, Feb. 13, 1997, abandoned, which is a continuation of application No. 08/288,051, Aug. 10, 1994, abandoned.

[30] Foreign Application Priority Data

Aug. 16, 1993 [JP] Japan ..................................... 5-223836
Aug. 23, 1993 [JP] Japan ..................................... 5-229531

[51] Int. Cl.⁷ .................................................. G03G 15/00
[52] U.S. Cl. .......................... 399/374; 271/186; 271/902; 355/23; 358/496; 358/498; 399/367; 399/373
[58] Field of Search .................................... 399/374, 365, 399/367, 372, 17, 364, 373; 355/23, 24; 271/186, 185, 902; 358/496, 498

[56] References Cited

U.S. PATENT DOCUMENTS

| | | |
|---|---|---|
| 4,699,365 | 10/1987 | Smith et al. ............................ 271/3.05 |
| 4,884,794 | 12/1989 | Dinatale et al. ..................... 271/186 X |
| 4,925,176 | 5/1990 | Acquaviva ........................... 271/902 X |
| 5,032,868 | 7/1991 | Nishino et al. . |
| 5,055,946 | 10/1991 | Kurahashi et al. ..................... 358/498 |
| 5,184,185 | 2/1993 | Rasmussen et al. . |
| 5,339,139 | 8/1994 | Fullerton et al. ................... 355/308 X |
| 5,486,911 | 1/1996 | Rubscha et al. ......................... 399/364 |
| 5,597,153 | 1/1997 | Maruyama et al. ................ 399/374 X |
| 5,784,680 | 7/1998 | Taruki ..................................... 399/374 |

FOREIGN PATENT DOCUMENTS 4018123  12/1990  Germany .

OTHER PUBLICATIONS

Research Disclosure, No. 330, Emsworth, GB, "Digital Copying Device with Recirculating Original Document Facility", pp. 800–810 (Oct. 1991).

*Primary Examiner*—Susan S. Y. Lee
*Attorney, Agent, or Firm*—Fitzpatrick, Cella, Harper & Scinto

[57] ABSTRACT

A both-face automatic original feeding apparatus wherein a plurality of originals having images on their first and second surfaces are successively supplied from an original stacking portion to a predetermined position for reading an original, and each original is reversely rotated through a switch-back path after the first surface of the original passes through the predetermined position, thereby supplying the original to the predetermined position again to direct the second surface of the original to the predetermined position. In such a feeding apparatus, there is provided an introduction path for directing the original supplied from the original stacking portion to the predetermined position; a first discharge path for directing the original to the switch-back path after the original passes through the predetermined position; a surface reverse path for directing the original from the switch-back path to the predetermined position after reversing a first surface and a rear surface of the original; and a controller for controlling the apparatus in such a manner that a preceding original is switched back to convey it in the surface reverse path while a succeeding original is being passed through the predetermined position, and, when a trailing end of the succeeding original leaves the predetermined position, a tip end of the preceding original reaches the predetermined position.

24 Claims, 9 Drawing Sheets

BOTH-FACE AUTOMATIC ORIGINAL FEEDING APPARATUS

This application is a continuation of application Ser. No. 08/800,761 filed Feb. 13, 1997, now abandoned which is a continuation of application Ser. No. 08/288,051 filed Aug. 10, 1994, now abandoned.

BACKGROUND OF THE INVENTION

1. Field of the Invention

The present invention relates to a both-face automatic original feeding apparatus, and more particularly, it relates to an automatic original feeding apparatus which is incorporated into an image forming apparatus such as a copying machine, a laser beam printer and the like and in which a plurality of originals having images on their both surfaces are automatically and successively conveyed to a reading position to read the images formed on both surfaces of the originals.

2. Related Background Art

In automatic original feeding apparatuses incorporated into an image forming apparatus such as a copying machine, a plurality of originals are automatically and successively sent to a reading position to read images formed on the originals and the read originals are successively discharged. In this case, when the images to be read are formed on front and back surfaces (i.e. first and second surfaces) of the original, the original is reversely rotated (i.e. turned up) so that the image formed on the first surface and the image formed on the second surface can be automatically read.

The original having the images on its both surfaces is firstly supplied from an original stacking portion to a predetermined position, i.e. a reading position for reading the original, thereby reading the image formed on the first surface of the original. In case of an original having an image on its first surface alone, after the image formed on the first surface is read, the original is then discharged from the reading position. On the other hand, when the original also has the image on its second surface, after the image formed on the first surface is read, the original is temporarily stored in a switch-back path, for example. Then, the original is supplied to the reading position again through a path (reverse rotation path or surface reverse path) different to a path through which the original was sent to the switch-back path, thereby reading the image formed on the second surface. After the image formed on the second surface is read, the original is discharged from the reading position. By repeating the above-mentioned series of operations (i.e. the operation for supplying the original to the reading position to read the image on the first surface, the operation for temporarily storing the original in the switch-back path after the reading of the first surface image, the operation for supplying the original to the reading position again to read the image on the second surface, and the operation for discharging the original after the reading of the second surface image) for each original, the images formed on both surfaces of the plural originals can be automatically turned up and automatically read without manual operation.

Incidentally, in the image forming apparatus, an electrostatic latent image corresponding to the read image is formed on an image bearing member such as a photosensitive drum, and then the latent image is developed as a toner image which is in turn transferred onto a transfer material such as a paper sheet. Thereafter, the toner image(s) is fixed to the transfer material and then the transfer material is discharged from the image forming apparatus as a finished copy.

According to the above-mentioned conventional technique, after the reading of the image formed on the first surface of the original is finished and before the reading of the image formed on the second surface of the same original is started, there must be provided the reverse rotation time for turning up the original, which does not directly contribute to the actual image reading. By the way, in the case where the both-face imaged originals are continuously copied, even when the above-mentioned reverse rotation time is provided for each original in addition to the image reading times, if a copying speed of the image forming apparatus is not so high, the reading of the images on both surfaces of the original and the reverse rotation of the original can be effected within the total copying time determined by the copying ability of the image forming apparatus, and, thus, the substantial copying time is not increased.

However, in recent digital copying machines in which digital reading and memory storage are combined, the copying operation is effected at a very high speed to reduce the copying time, so that it is difficult to effect the reading of the images on both surfaces of the original and the reverse rotation of the original within the copying time. That is to say, in case of one-face original having the image on its one surface alone, since there is no need to provide the reverse rotation time, the originals can be successively read continuously to minimize the reading time. However, in case of the both-face original having the images on its both surfaces, since the reverse rotation time must be provided as well as the reading time, the reverse rotation time causes a bad influence, such as lost time.

SUMMARY OF THE INVENTION

The present invention aims to eliminate the above-mentioned conventional drawback, and an object of the present invention is to provide a both-face automatic original feeding apparatus, a reading apparatus and an image forming apparatus having such a feeding apparatus or reading apparatus.

Another object of the present invention is to provide a both-face automatic original feeding apparatus which can eliminate substantial reverse rotation time by reversely rotating (turning up) an original while reading another original.

To achieve the above objects, according to one aspect of the present invention, there is provided an automatic original feeding apparatus wherein a plurality of originals having images on their first and second surfaces are successively supplied from an original stacking portion to a predetermined position for reading the original, and each original is reversely rotated (turned up) through a switch-back path after the image formed on the first surface of the original is read, thereby supplying the original to the predetermined reading position again to read the image formed on the second surface of the original, which automatic original feeding apparatus comprises an introduction path for directing the original supplied from the original stacking portion to the reading position, a first discharge path for directing the original to the switch-back path after the image formed on the first surface of the original is read, and a surface reverse path for directing the original from the switch-back path to the reading position while reversely rotating the original, and is characterized in that a preceding original is switched back in the switch-back path while a succeeding original is being passed through the predetermined reading position.

Further, a reverse rotation means is provided in the switch-back path, the sum of a path length from the predetermined reading position to the surface reverse path through the first discharge path and a path length from the reverse rotation path to the predetermined position through the surface reverse path is selected to become greater than the twice of a length of the original in an original feeding direction, and a path length from a tip end position of the original at a waiting position to a junction between the surface reverse path and the introduction path is selected to become smaller than the length of the original in the original feeding direction.

In this case, the automatic original feeding apparatus includes a detection means for detecting the tip end position of the original supplied from the original stacking portion to the predetermined position through the introduction path to read the image formed on the first surface of the original, and a control means for adjusting the timing of re-supply of the original to be re-supplied from the switch-back path to the predetermined position through the surface reverse path to read the image formed on the second surface of the original, and the control means determines the re-supply timing of the original on the basis of an output from the detection means.

According to another aspect of the present invention, there is provided an automatic original feeding apparatus which performs a supplying step for directing a tip end of an original supplied from an original stacking portion to a reading position, a first surface reading step for reading a first surface of the original effected until a trailing end of the original has just passed through the reading position after the tip end of the original passed through the reading position, a first discharging step for conveying the original to a waiting position after the first surface reading step, a re-supplying step for directing the tip end of the original re-supplied from the waiting position to the reading position, a second surface reading step for reading a second surface of the original effected until the trailing end of the original has just passed through the reading position after the tip end of the original passed through the reading position, and a second discharging step for discharging the original after the second surface reading step. Wherein, regarding the above-mentioned steps, during the first surface reading step for a given original, the re-supplying step for a preceding original preceding to the given original is effected, and, during the second surface reading step for the preceding original, the first discharging step for the given original and the supplying step for a succeeding original following to the given original are effected, so that the first surface reading step for the given original and the second surface reading step for the preceding original are continuously effected alternately.

According to a further aspect of the present invention, there is provided a both-face automatic original feeding apparatus wherein a plurality of originals having images on its first and second surfaces are successively supplied from an original stacking portion to a predetermined position and, after the first surface of the original passes through the predetermined position, the original is reversely rotated through a switch-back path and then is resupplied to the predetermined position, which bothface automatic original feeding apparatus comprises an introduction path for directing the original supplied from the original stacking portion to the predetermined position, a first discharge path for directing the original to the switch-back path after the first surface of the original passes through the predetermined position, a surface reverse path for directing the original from the switch-back path to the predetermined position while reversing a front surface and a rear surface of the original, and a reverse rotation means disposed within the switch-back path for directing the original from the first discharge path to the switch-back path during normal rotation thereof and for supplying the original to the surface reverse path during reverse rotation thereof.

According to a still further aspect of the present invention, there is provided a both-face automatic original feeding apparatus wherein a plurality of originals having images on its first and second surfaces are successively supplied from an original stacking portion to a reading position and, after the first surface of the original is read, the original is reversely rotated through a switch-back path and then is re-supplied to the reading position to read the second surface of the original, which both-face automatic original feeding apparatus comprises an introduction path for directing the original supplied from the original stacking portion to the reading position, a first discharge path for directing the original to the switch-back path after the first surface of the original is read, a surface reverse path for directing the original from the switch-back path to the reading path while reversely rotating the original, and a reverse rotation means disposed within the switch-back path and adapted to direct the original from the first discharge path to the switch-back path during normal rotation thereof, to wait the original at a waiting position during stoppage thereof, and to supply the original from the waiting position to the surface reverse path during reverse rotation thereof, and is characterized in that the sum of a path length from the reading position to the reverse rotation means through the first discharge path and a path length from the reverse rotation means to the reading position through the surface reverse path is selected to become greater than twice of a length of the original in an original feeding direction, and a path length from a tip end of the original at the waiting position to a junction between the surface reverse path and the introduction path is selected to become smaller than the length of the original in the original feeding direction.

With the arrangements as mentioned above, after the first surface of the succeeding original passes through the pre-determined position, the preceding originals can be successively re-supplied to the predetermined position. On the other hand, after the second surface of the preceding original is read, a succeeding original can be supplied from the original stacking portion to the predetermined position. Accordingly, in the predetermined position, the passage of the first surface of the original supplied from the original stacking portion and the passage of the second surface of the re-supplied original can be continuously effected alternately, and, the supply, re-supply, reverse rotation and discharge of the originals associated with the passage of these originals can be effected simultaneously.

As mentioned above, since the both-face automatic original feeding apparatus according to the present invention is constituted as mentioned above, the exchange of originals can be effected quickly, thereby reducing the total treating time.

DETAILED DESCRIPTION OF THE PREFERRED EMBODIMENTS

The present invention will now be explained with reference to the accompanying drawings.

First Embodiment

Figure 1:
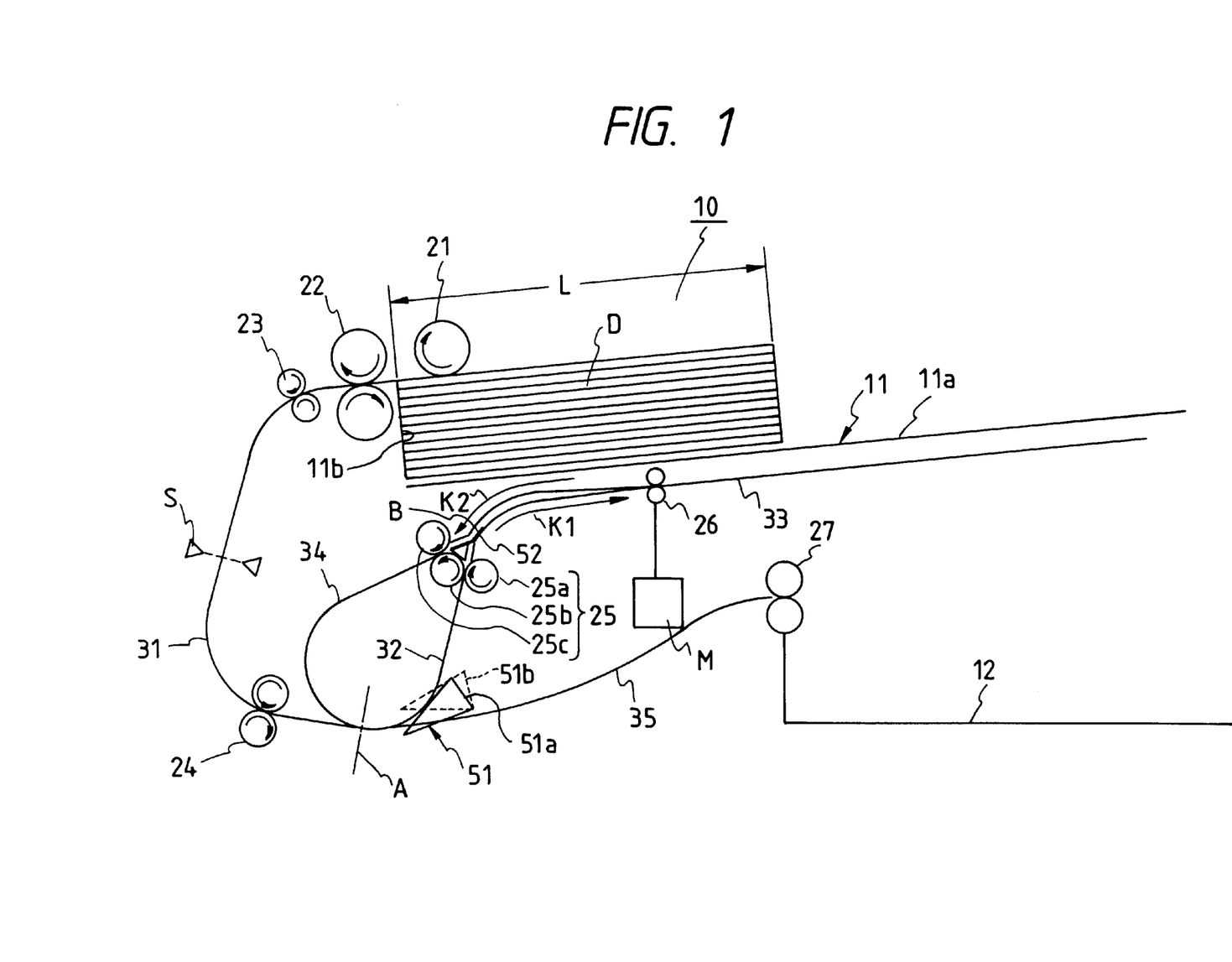
FIG. 1 is a schematic elevational sectional view of an automatic original feeding apparatus according to a first embodiment of the present invention.

As shown in FIG. 1, an automatic original feeding apparatus 10 has an original stacking plate (original stacking portion) 11 on which a plurality of originals D (reffered to as "original D" when the original is not required to be specified from the other originals and to "original Dn" (n is natural number) when the originals are required to be specified, hereinafter) are stacked. The original stacking plate 11 has a slightly inclined original stacking surface 11a, and an original abutment surface 11b against which a tip end of the original D is abutted is formed on a lower end (left end in FIG. 1) of the original stacking surface 11a. In the illustrated embodiment, each original D has front and back surfaces, i.e. first and second surfaces, and a length of the original D from its tip end to its trailing end, i.e. a length of the original D in an original feeding direction is L.

A supply roller 21 is rotatably supported above a tip end of the original stack. The supply roller 21 is urged against an uppermost original D of the original stack set on the original stacking plate 11 with a predetermined urging force from the above and serves to supply the originals S from the uppermost one when the supply roller is rotated. If plural originals D are supplied, the uppermost original is separated from the other original(s) by a pair of separation rollers 22, thereby preventing the double feed of the originals. As a result, the single original is conveyed to an introduction path 31 by a pair of convey rollers 23.

The introduction path 31 starting from the original stacking plate 11 is extended to the left in FIG. 1 (referred to as "front" or "front side" hereinafter) and then is downwardly curved to direct downwardly, and then is further curved to the right in FIG. 1 (referred to as "rear" or "rear side" hereinafter) to reach a reading position A. Immediately before the reading position A, there are arranged a pair of convey rollers 24. The introduction path 31 serves to direct the original D supplied from the original stacking plate 11 to the reading position A.

Figure 9:
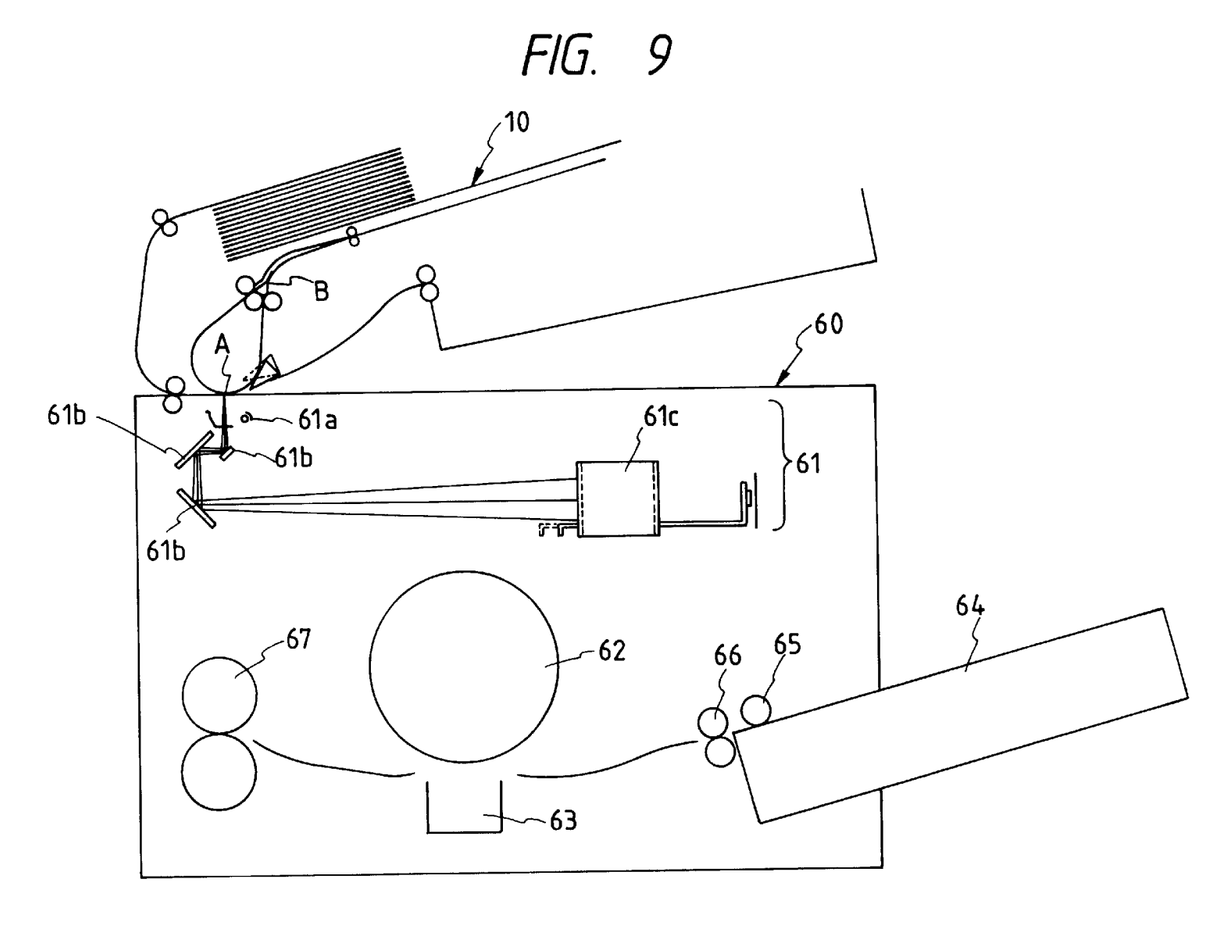
FIG. 9 is a schematic elevational sectional view of an image forming apparatus into which the automatic original feeding apparatus of the present invention is incorporated.

As shown in FIG. 9, in the reading position A, an imaged surface of the original D supplied with the imaged surface facing downwardly is illuminated by light emitted from a light source 61a of an optical system 61 disposed at an upper portion of an image forming apparatus 60, and light reflected from the original is read by a reading apparatus through a mirror 61b and the like. In the illustrated embodiment, the reading position A arranged at an ending terminal is coincided with a junction between the introduction path 31 and a reverse rotation path, i.e., surface reverse path 34 which will be described later. Incidentally, an embodiment wherein the reading position A is not coincided with the junction will be described later.

The introduction path 31 is connected to a first discharge path 32 at the reading position A. The first discharge path 32 starting from the reading position A is smoothly curved upwardly and rearwardly to reach a branched portion B. Normal rotation rollers 25a, 25b rotated in directions shown by the arrows are disposed in the first discharge path 32 in front of the branched portion B. The first discharge path 32 serves to convey the original the first surface of which was read at the reading position A in a direction shown by the arrow K to direct the original into a switch-back path 33 connected to the discharge path 32 at the branched portion B.

The switch-back path 33 starting from the branched portion B extends rearwardly below and along the original stacking surface 11a of the original stacking plate 11. A pair of reverse rotation rollers (reverse rotation means) 26 are arranged in the switch-back path 33. The pair of reverse rotation rollers 26 can be rotated normally or reversely and can be stopped by a motor and the like. When the pair of reverse rotation rollers are rotated normally, the original D from the first discharge path 32 is introduced into the switch-back path 33. When the pair of reverse rotation rollers are stopped, the original D is waiting in the switch-back path 33. When the pair of reverse rotation rollers are rotated reversely, the original D is supplied from the switch-back path 33 to a surface reverse path 34 which will be described hereinbelow.

The surface reverse path 34 is branched from the first discharge path 32 at the branched portion B to reach the reading position A. The reverse rotation path 34 starting from the branched portion B is curved forwardly and downwardly to form a loop reaching the reading position A from the front side, similar to the introduction path 31. A pair of normal rotation rollers 25b, 25c rotated in directions shown by the arrows are arranged in the surface reverse path 34 near and at a downstream side of the branched portion B. Incidentally, the reverse rotation roller 25b is common to the reverse rotation roller 25 disposed in the first discharge path 32.

Further, an elastic flapper 52 is arranged at the branched portion B. The elastic flapper 52 permits the passage of the original D advancing in the first discharge path 32 upwardly and passing through the branched portion B from the below to the above by rotation of the reverse rotation rollers 25a, 25b (i.e. the original D conveyed from the first discharge path 32 to the switch-back path 33) and prevents the passage of the original D passing through the branched portion B from the above to the below by the rotation of the pair of reverse rotation rollers 26 from entering into the first discharge path 32, thereby introducing the original D from the switch-back path 33 into the surface reverse path 34. The surface reverse path 34 serves to direct the original D re-supplied from the waiting position in the switch-back path 33 and conveyed in the direction K2 to the reading position A. The first surface of the original D directed to the reading position A through the introduction path 31 faces downwardly; whereas, the original D directed to the reading position A through the surface reverse path 34 is re-supplied to the reading position with the second surface thereof facing downwardly. That is to say, the original D is re-supplied while being turned up.

The surface reverse path 34 is connected to a second discharge path 35. The second discharge path 35 starts from the reading position A and is slightly curved upwardly to extend rearwardly, and a pair of discharge rollers 27 are arranged at a rear end of the second discharge path 35. Further, the second discharge path 35 is branched from the first discharge path 32 immediately at a downstream side of the reading position A. A flapper 51 disposed at a branched portion between the first and second discharge paths is controlled by a plunger to switch the path for the original D from the reading position A between the first and second discharge paths. That is to say, the original D the image of the first surface of which was read at the reading position A is directed to the first discharge path 32 by rotating the flapper 51 to a solid line position 51a, and the original D the image of the second surface of which was read at the reading position A is directed to the second discharge path 35 by rotating the flapper 51 to a broken line position 51b. The original D directed into the second discharge path 35 is discharged onto a discharge tray 12 through the pair of discharge rollers 27.

With the arrangement as mentioned above, the sum of a path length extending from the reading position A to the pair of reverse rotation rollers 26 through the first discharge path 32, the branched portion B and a part of the switch-back path 33 and a path length extending from the pair of reverse rotation rollers 26 to the reading position A through the part of the switch-back path 33, the branched portion B and the surface reverse path 34 is selected to become greater than twice of a length L of the original D in an original feeding direction. Incidentally, in the illustrated embodiment, each of the above-mentioned path lengths is selected to become greater than the length L of the original D in the original feeding direction, since, when two originals exist in the surface reverse path 34 and the first discharge path 32, respectively, and original is not pinched between the pair of reverse rotation rollers 26.

Further, a path length extending from a tip end of the original rested at the waiting position in the switch-back path 33 (an end of the original near the branched portion B, which end is a trailing end of the original when the original is rested on the original stacking plate 11) to the reading position A (junction between the surface reverse path 34 and the introduction path 31) through the branched portion B and the surface reverse path 34 is selected to become smaller than the length L of the original D in the original feeding direction, so that the preceding original can reach the reading position A immediately after the succeeding original passed through the reading position A.

Next, the operation of the automatic original feeding apparatus 10 will be explained with reference to FIGS. 2A to 2D. In FIGS. 2A to 2D, first, second and third originals are denoted by $D_1$, $D_2$ and $D_3$, respectively. Further, ① and ② of the original $D_1$ denote first and second surfaces of the first original, respectively, ③ and ④ of the original $D_2$ denote first and second surfaces of the second original, respectively, and ⑤ and ⑥ of the orignal $D_3$ denote first and second surfaces of the third original, respectively. In other words, ①, ③ and ⑤ denote the first surfaces of the first, second and third originals $D_1$, $D_2$ and $D_3$, respectively, and ②, ④ and ⑥ denote the second surfaces of the first, second and third originals $D_1$, $D_2$ and $D_3$, respectively. In the illustrated embodiment, the sequence for reading the images on the originals is ①→③→②→⑤→④→(⑦)→⑥. (Further, in conclusion, during the reading of the image, by simultaneously effecting the supply, reverse rotation, re-supply, first discharge and second discharge of the originals, it is possible to reduce or eliminate loss time caused by the reverse rotation or the like. Now the operation of the disclosed apparatus will be fully described.

Figure 2A:
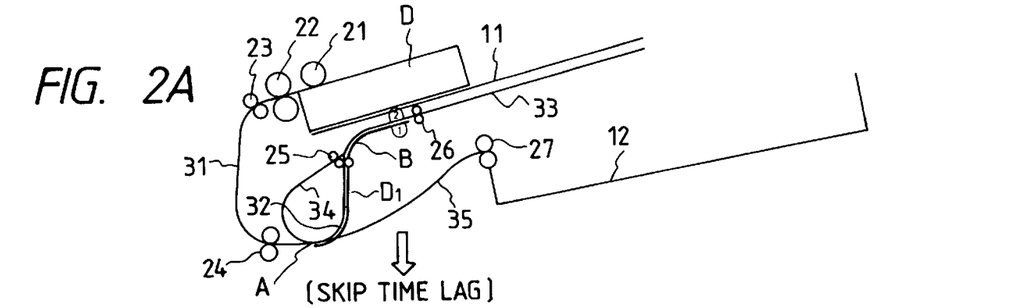
FIGS. 2A, 2B, 2C, and 2D are views for explaining an operation of the automatic original feeding apparatus of FIG. 1.

First of all, the first original $D_1$ is supplied to the introduction path 31 through the supply roller 21, separation rollers 22 and convey rollers 23, 24 so that the tip end of the original $D_1$ reaches near the reading position A (supplying step). Then, the original $D_1$ from its tip end to its trailing end is passed through the reading position A by the convey rollers 24 and the normal rotation rollers 25, thereby reading the first surface ① of the original (first surface reading step). FIG. 2A shows a condition that immediately after the first surface of the original $D_1$ was read. In this case, a forward half of the original $D_1$ exceeds the branched portion B and enters into the switch-back path 33, and a rearward half of the original remains in the first discharge path 32. However, since the path length from the reading position A to the pair of reverse rotation rollers 26 is greater than the length L of the original $D_1$ in the original feeding direction, the tip end of the original $D_1$ does not reach the pair of reverse rotation rollers 26.

Figure 2B:
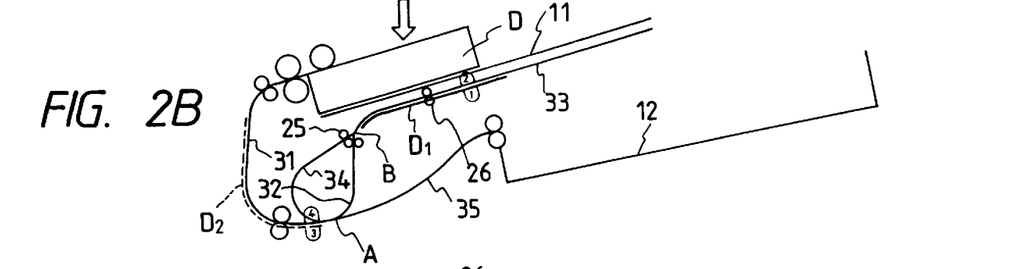

By rotating the normal rotation rollers 25 and the reverse rotation rollers 26 normally, the first original $D_1$ is directed into the switch-back path 33. After the first original passes through the branched portion B completely (this fact is detected by a sensor disposed at the branched portion), the reverse rotation rollers 26 are stopped, thereby waiting the original $D_1$ at the waiting position (FIG. 2B; first discharging step). In this case, in response to a waiting completion signal, the second original $D_2$ is supplied near the reading position A (supplying step). The original $D_2$ may be supplied from the original stacking plate 11 or may be previously conveyed on the way for a waiting condition or may be previously supplied so that it reaches near the reading position A when the first original $D_1$ reaches the waiting position. Incidentally, in the first discharging step for the first original $D_1$, there is a skip time during which the original D is not read.

Figure 2C:
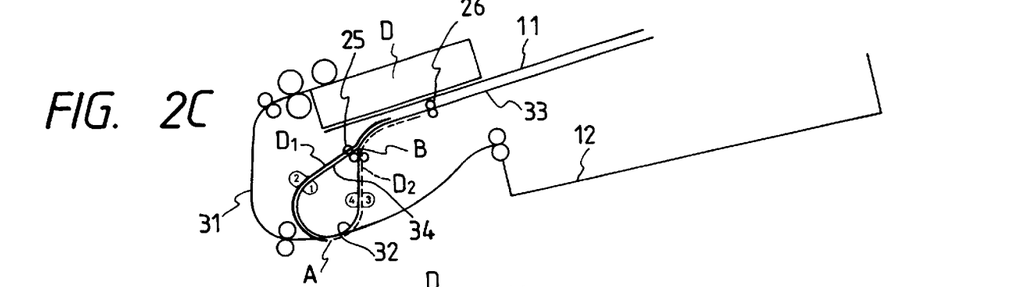

Then, following to the supplying step, the first surface reading step for reading the first surface ③ of the second original $D_2$ is effected (FIG. 2C). When a small time period ((size)−(path length)+(distance between the originals)) elapses after a reading start signal is emitted from a sensor disposed at the reading position A and adapted to detect the original, the switch-back of the original is started, so that the first original $D_1$ at the waiting position in the switch-back path 33 is resupplied to near the reading position A through the surface reverse path 34 by rotating the reverse rotation rollers 26 reversely and rotating the normal rotation rollers 25 normally before the first surface reading step is finished (re-supplying step). In the above first surface reading step and re-supplying step, by the rotation of the normal rotation rollers 25, the second original $D_2$ and the first original $D_1$ are simultaneously conveyed in opposite directions, so that the portions of the originals are overlapped between the branched portion B and the pair of reverse rotation rollers 26. Further, after these steps are finished, as shown in FIG. 2C, both the original $D_1$ and the original $D_2$ are situated between the reading position A and the pair of reverse rotation rollers 26.

Figure 2D:
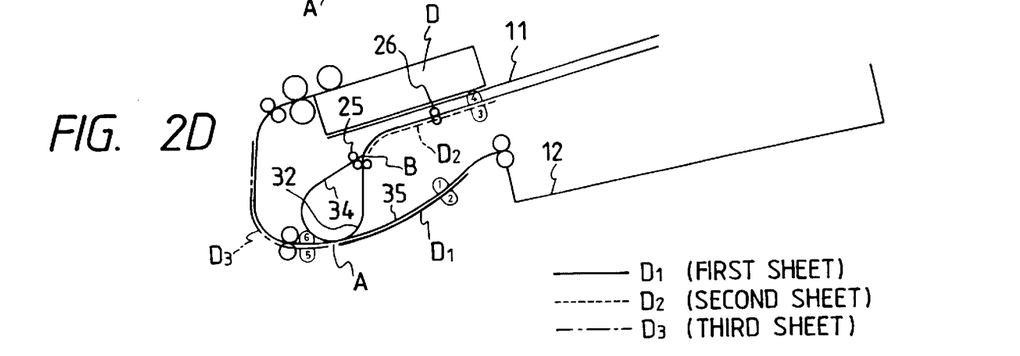

Then, the first original $D_1$ is directed to the second discharge path 35 while reading the second surface ② of this original $D_1$ (second surface reading step). Before the second surface reading step for the original $D_1$ is finished, the first discharging step for the second original $D_2$ and the supplying step for the third original $D_3$ are finished (FIG. 2D).

In this way, immediately after the second surface reading step for the first original $D_1$ is finished, the first surface reading step for the third original $D_3$ can be effected.

That is to say, by performing the sequence shown in FIGS. 2A to 2D, the first surface reading step for the first original $D_1$, the first surface reading step for the second original $D_2$ after the skip time elapsed, the second surface reading step for the first original $D_1$, the first surface reading step for the third original $D_3$, the second surface reading step for the second original $D_2$ and so on can be effected. In other words, regarding a plurality of originals, the first surface reading step and the second surface reading step can be continuously effected alternately. Further, the remaining steps other than the first and second surface reading steps, i.e. the supplying step, first discharging step, re-supplying step and second discharging step can be effected simultaneously with the first and second surface reading steps within the times required for performing the reading steps. Thus, the reversely rotating step comprising the first discharging step and the re-supplying step, and the supplying step and the second discharging step do not provide remarkable lost time.

Incidentally, in the illustrated embodiment, although all of the rollers are rotated at the same speed, the feeding speeds of the originals may be adjusted by increasing or decreasing the rotational speeds of the rollers in accordance with the original feeding condition. Further, in order to keep the distance between the originals constant, the rotational speeds of the rollers and the start and stop timing of the rollers may be adjusted in accordance with the size of the original. For example, since the path length are constant and the size of the original is limited to several kinds (for example, A4 size, B5 size), several stages of the rotational speeds of the rollers may be provided and a desired rotational speed can be selected.

Second Embodiment

Figure 3:
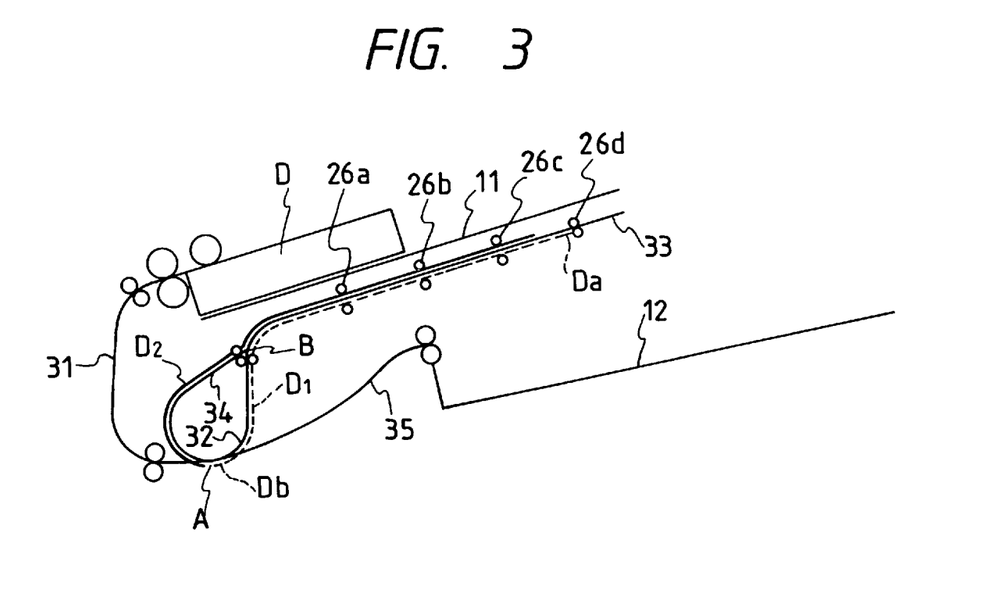
FIG. 3 is a schematic elevational sectional view of an automatic original feeding apparatus according to a second embodiment of the present invention.

In the above-mentioned first embodiment, since the position of the pair of reverse rotation rollers 26 is fixed, an original having a longer length L in the original feeding direction cannot be handled in the first embodiment. To avoid this, in a second embodiment, as shown in FIG. 3, a plurality of pairs of reverse rotation rollers 26a, 26b, 26c, 26d are arranged along the switch-back path 33. Further, regarding the pair of reverse rotation rollers 26a, 26b, 26c other than the pair of reverse rotation rollers 26d remote from the branched portion B, each upper roller and lower roller can be shifted toward and away from the original D by a moving means (a plunger and an arm). Depending upon the length L of the original D in the original feeding direction, the pair of reverse rotation rollers to be used are selected. Such selection is as follows.

The pair of reverse rotation rollers are selected so that the path length extending from the reading position A to said pair of reverse rotation rollers through the first discharge path 32 becomes longer than the lengths L of the originals $D_1$, $D_2$ in the original feeding direction and such a path length becomes shortest. For example, in the case shown in FIG. 3, the pair of reverse rotation rollers 26d is selected. Regarding the pairs of reverse rotation rollers 26a, 26b, 26c other than the pair of reverse rotation rollers 26d, since the path length extending from the reading position A becomes smaller than the lengths L of the originals $D_1$, $D_2$ in the original feeding direction, the above-mentioned requirements cannot be satisfied, and, thus, these pairs of rollers 26a, 26b, 26c are separated from the originals $D_1$, $D_2$ not act on these originals.

Third Embodiment

In the second embodiment, a plurality of pairs of reverse rotation rollers were provided. In place of this second embodiment, a pair of reverse rotation rollers 26 may be shifted along the switch-back path 33 by a shifting means (a pinion and a rack). The positioning of the pair of reverse rotation rollers by means of the shifting means is substantially the same as the second embodiment. That is to say, as shown in FIG. 3, when the trailing end Db of the original $D_1$ is aligned with the reading position A and the tip end Da of the original is positioned in the switch-back path 33, the pair of reverse rotation rollers 26 are positioned immediately behind the tip end Da of the original.

Fourth Embodiment

In place of the second and third embodiments, there are provided a plurality of switch-back paths having different distances between the branched portion B and the pair of reverse rotation rollers in accordance with the lengths L of the original D in the original feeding direction. Depending upon the length L of the original D in the original feeding direction, a desired switch-back path is selected.

Fifth Embodiment

Figure 4:
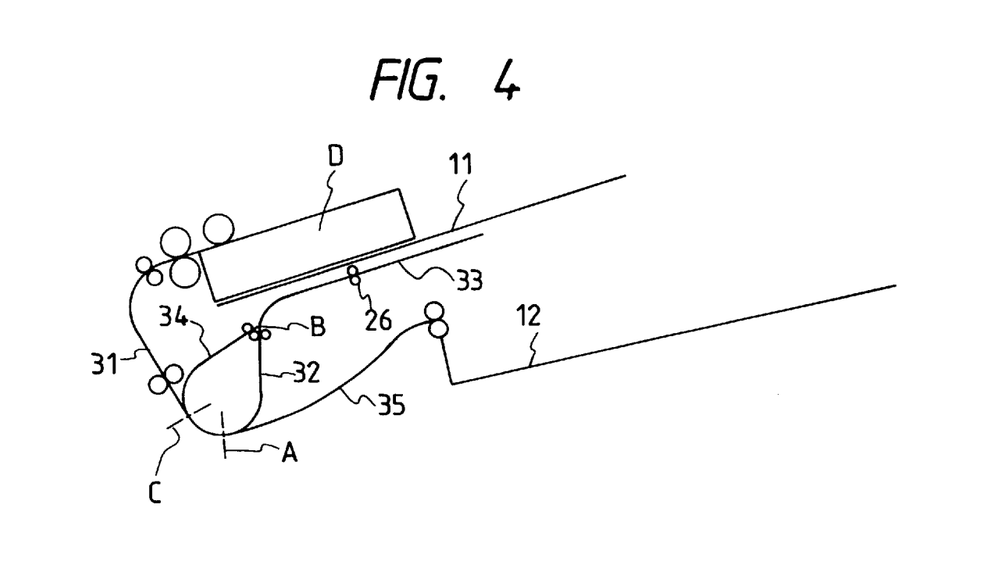
FIG. 4 is a schematic elevational sectional view of an automatic original feeding apparatus according to a fifth embodiment of the present invention.

In the first embodiment, the reading position A was coincided with the junction between the introduction path 31 and the surface reverse path 34. In place of the first embodiment, as shown in FIG. 4, the junction C between the introduction path 31 and the surface reverse path 34 may be arranged at an upstream side of the reading position A. Further, the reading position A can be arranged at any point in the path between the junction C and the branched portion B, and, thus, the position of the reading position is not limited to the specific point.

Sixth Embodiment

Figure 5:
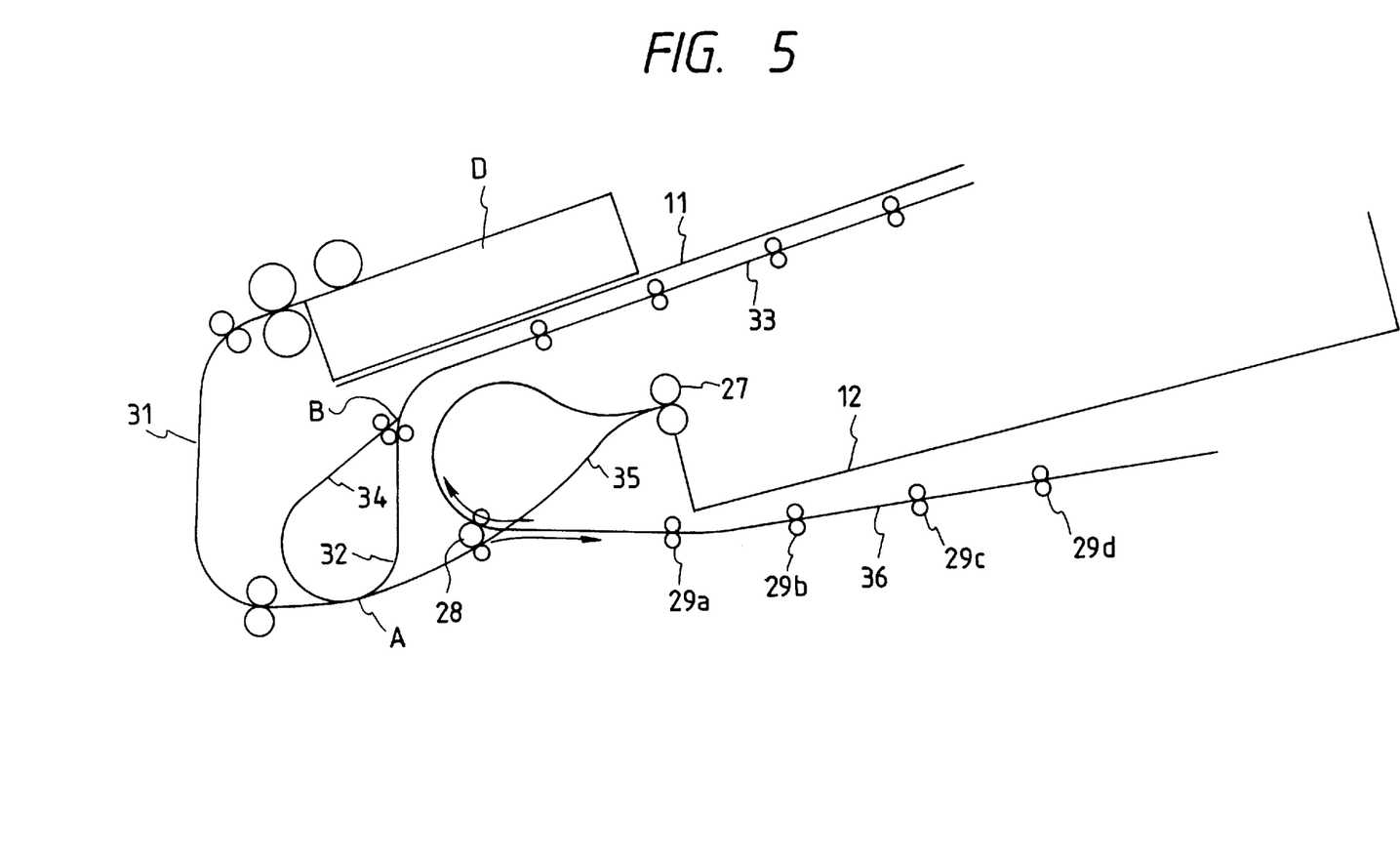
FIG. 5 is a schematic elevational sectional view of an automatic original feeding apparatus according to a sixth embodiment of the present invention.

As shown in FIG. 5, a discharge switch-back path 36 may also be provided in association with the second discharge path 35 so that, after the original is re-turned up again, the original is discharged onto the discharge tray 12. In this case, the originals D can be collected on the discharge tray 12 in the same page sequence as that of the originals stacked on the original stacking plate 11. When normal rotation rollers 28 are provided in association with the discharge switch-back path 36 and a plurality of pairs of discharge reverse rotation rollers 29a, 29b, 29c, 29d are arranged in the discharge switch-back path 36, the originals having the different lengths L in the original feeding direction can be handled effectively, as is in the aforementioned case. Incidentally, in place of the plurality of pairs of discharge reverse rotation rollers, a single pair of discharge reverse rotation rollers may be arranged so that they can be shifted along the discharge switch-back path 36.

Seventh Embodiment

Figure 6:
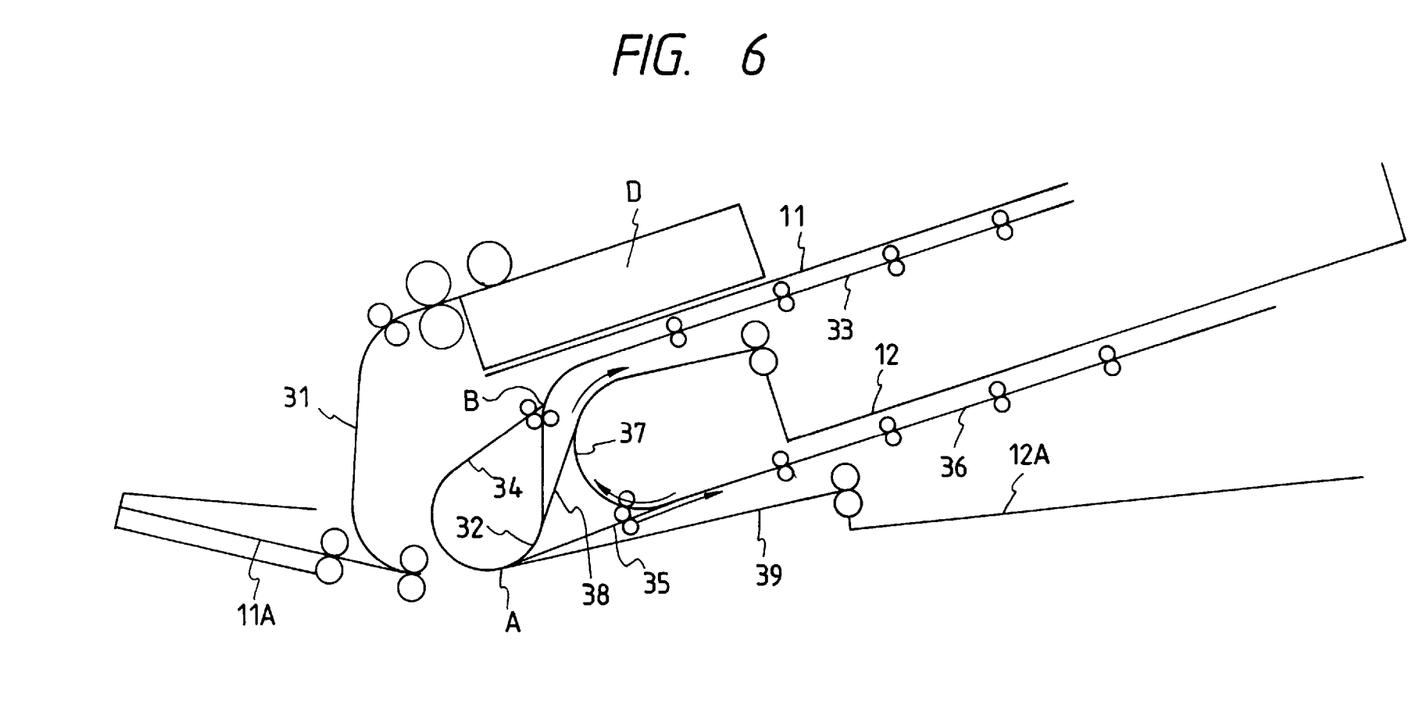
FIG. 6 is a schematic elevational sectional view of an automatic original feeding apparatus according to a seventh embodiment of the present invention.

As shown in FIG. 6, a one-face original is charge path 38 for exclusively handling one-face originals may be provided. Further, an additional introduction path 11A for supplying a bad original (thin, great thick, folded or wrinkled original) or a manual inserted original may be provided. A surface reverse path 37 constitutes a part of the discharge switch-back path 36, and guides the front/rear surface of the switch-backed sheet to the discharge tray 12. In addition, a manual insertion original discharge path 39 may also be provided.

Eighth Embodiment

Figure 7:
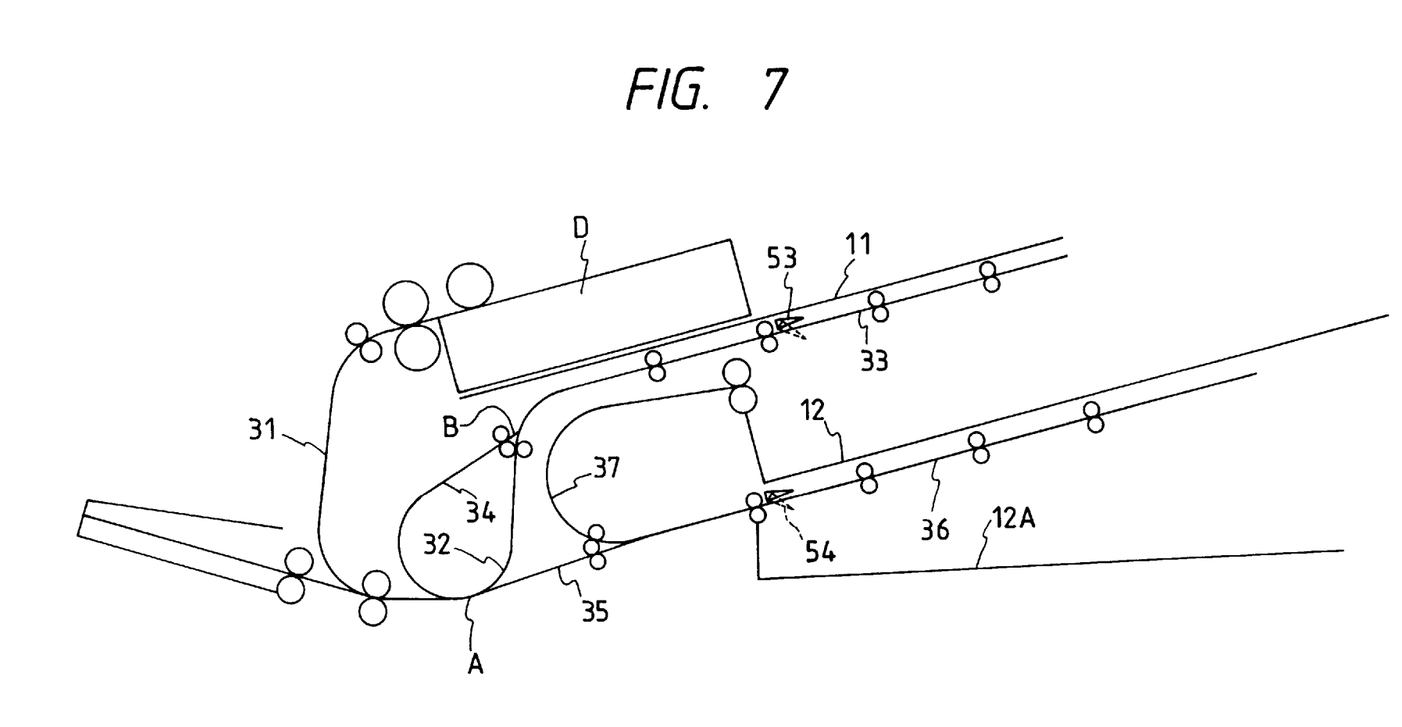
FIG. 7 is a schematic elevational sectional view of an automatic original feeding apparatus according to an eighth embodiment of the present invention.

As shown in FIG. 7, the switch-back path 33 may also be used as a discharge path for the one-face original. In this case, by switching a one-face original discharge flapper 53 to a broken line position, the one-face original can be discharged onto the discharge tray 12. Furthermore, the discharge switch-back path 36 may also be used for the manual inserted original. In this case, by switching a manual insertion discharge flapper 54 to a broken line position, the manual inserted original can be discharged onto a tray 12A.

Ninth Embodiment

Figure 8A:
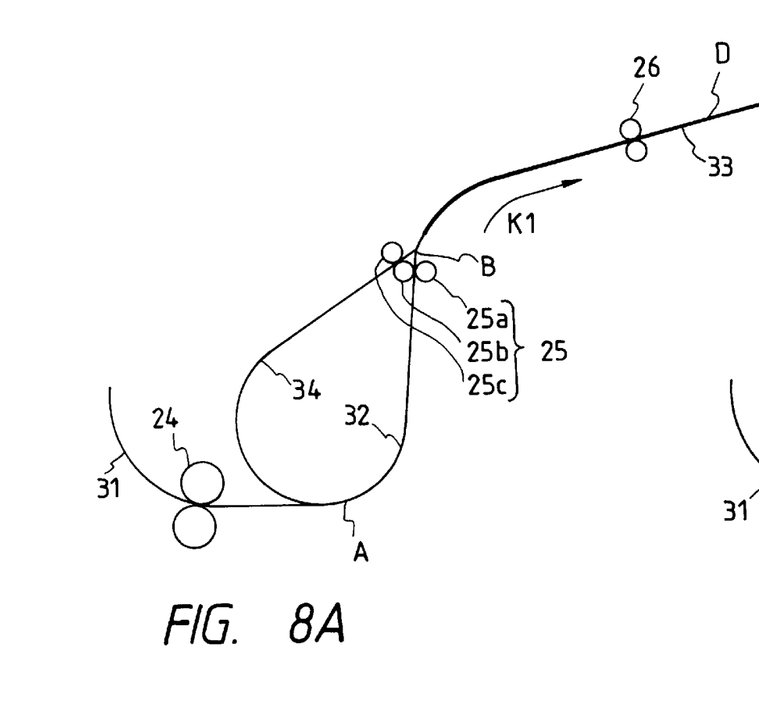
FIGS. 8A and 8B are views for explaining an operation of an automatic original feeding apparatus according to a ninth embodiment of the present invention.
Figure 8B:
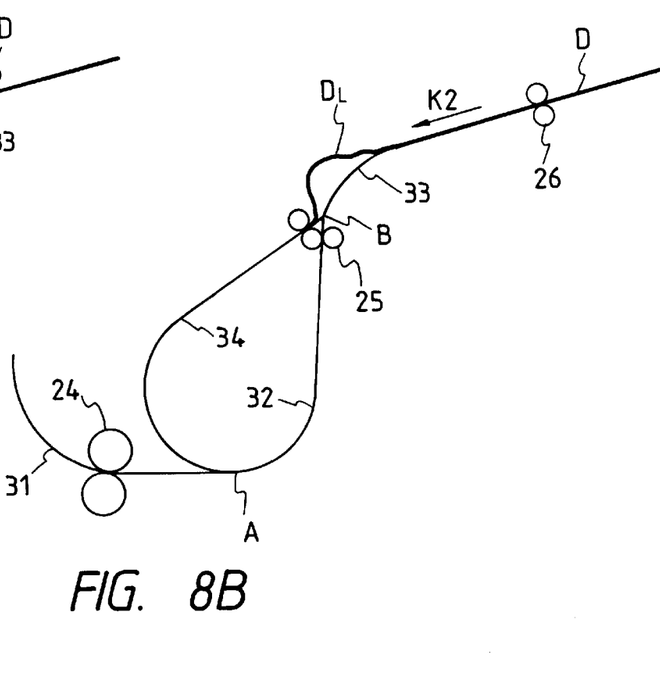

As shown in FIG. 8A, after the original D is introduced into the switch-back path 33 by rotating the reverse rotation rollers 26 normally, the reverse rotation rollers 26 are stopped to maintain the original at the waiting position. Thereafter, as shown in FIG. 8B, the reverse rotation rollers 26 are rotated reversely to convey the original D in a direction shown by the arrow K2 toward the normal rotation rollers 25. In this case, the normal rotation rollers 25 may be temporarily stopped so that a loop DL is formed in a tip end portion of the original D, thereby correcting the skew-feed of the original D.

Tenth Embodiment

As shown in FIG. 1, a detection means S for detecting a tip end position of the original D supplied from the original stacking plate 11 is provided in the introduction path 31 and a control means M for controlling the drive of the reverse rotation rollers 26 is also provided so that the reverse rotation rollers 26 are driven by the control means M on the basis of a signal from the detection means S, thereby adjusting the timing of the original D re-supplied from the waiting position. With this arrangement, it is possible to correct the unevenness in the supply of the originals D from the original stacking plate 11 and the unevenness in the conveying speed for the originals, thereby minimizing the distance between the originals to improve the reading efficiency. Further, in this case, the turned-up original can be re-supplied into the surface reverse path 34 on the way to wait the original there. In this case, when a detection means for detecting the tip end of the turned-up original is provided in the surface reverse path 34, the distance between the turned-up original and the next original can be determined more accurately.

Further, as shown in FIG. 1, by arranging the first discharge path 32, the switch-back path 33 and the surface reverse path 34 within a space between the original stacking plate 11 and the second discharge path 35, the entire automatic original feeding apparatus 10 can be made compact.

Eleventh Embodiment

As shown in FIG. 9, an automatic original feeding apparatus 10 according to the present invention can be incorporated into an image forming apparatus 60 such as a copying machine. In FIG. 9, the image forming apparatus includes a photosensitive drum 62, a transfer charger 63, a sheet supply cassette 64, a sheet supply roller 65, a pair of convey rollers 66 and a fixing device 67. An image formed on the photosensitive drum 62 and corresponding to the read image is transferred onto a sheet supplied from the sheet supply cassette 64 and is fixed to the sheet by the fixing device 67. Then, the sheet is discharged out of the image forming apparatus.

In the automatic original feeding apparatuses 10 explained in connection with the first to eleventh embodiments, the sheet supply means comprising the supply roller 21, separation rollers 22 and the like, and the convey means (convey rollers 23, 24, normal rotation rollers 25, reverse rotation rollers 26 and the like) in the paths are not to limited to the illustrated elements. Further, the number and shifting amount of the reverse rotation rollers 26 and the driving timing of the flapper 51 can be set appropriately.

Figure 10:
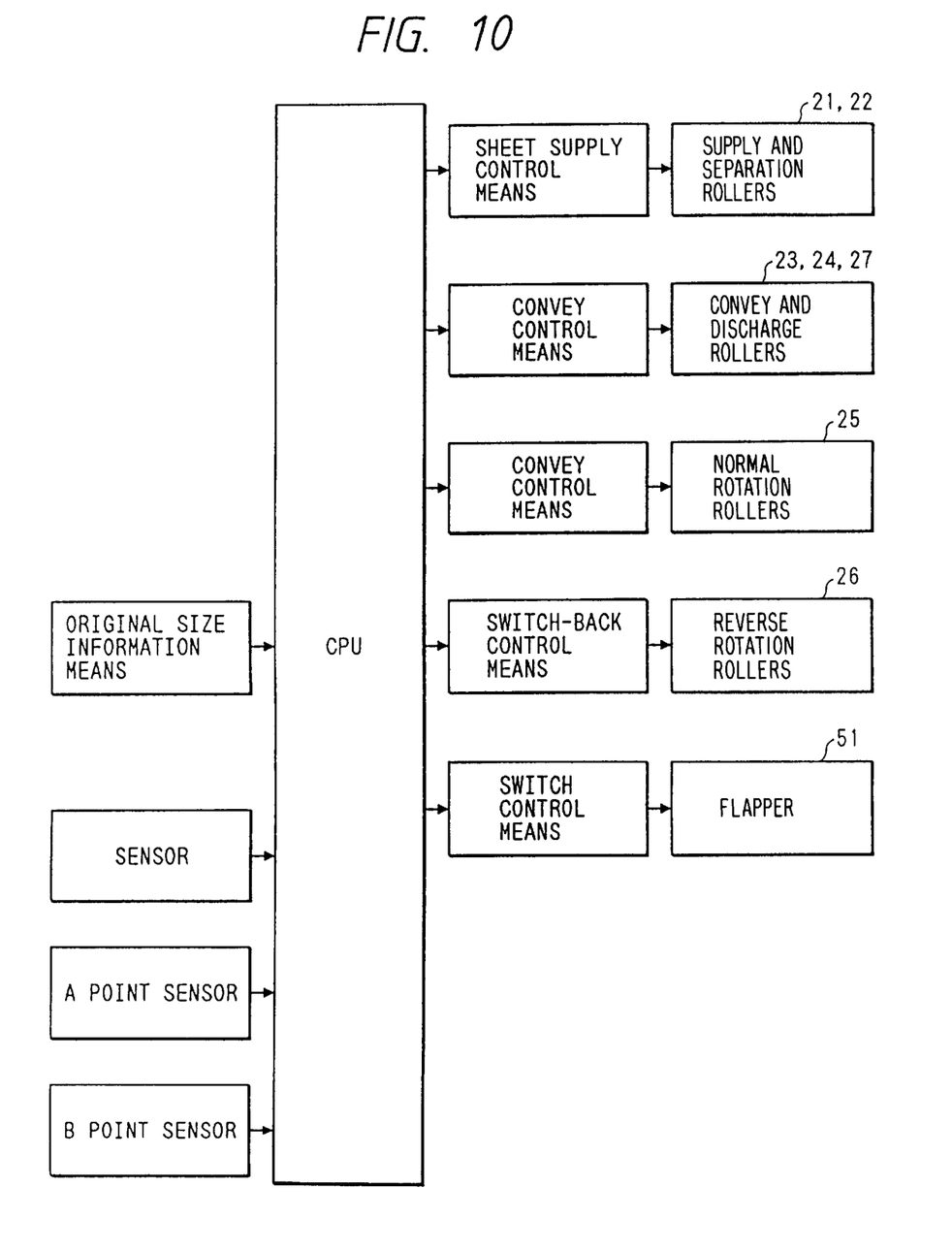
FIG. 10 is a block diagram.

FIG 10 is a block diagram schematically showing salient components of the present invention connected to a CPU.

What is claimed is:

1. A both-face automatic original feeding apparatus wherein a plurality of originals having images on their first and second surfaces are successively supplied from an original stacking position to a reading position for reading an original, and a surface of each original is reversed through a switch-back path after the first surface of the original passes through said reading position, thereby supplying the original to said reading position again to direct the second surface of the original to said reading position, comprising:

an introduction path for directing the original supplied from said original stacking position to said reading position;

a first discharge path for directing the original to said switch-back path after the original passes through said reading position;

a surface reverse path for directing the original from said switch-back path to said reading position after reversing a first surface and a second surface of the original; and a control means for controlling said apparatus in such a manner that a preceding original is switched back to convey the preceding original in said surface reverse path while a succeeding original is being passed through said reading position, and, when a trailing end of the succeeding original leaves said reading position, a tip end of the preceding original after being switched back reaches said reading position.

2. A both-face automatic original feeding apparatus according to claim 1, further comprising a control means for controlling the apparatus in such a manner that, when a trailing end of a preceding original leaves said reading position, a succeeding original is conveyed in said introduction path to reach said reading position.

3. A both-face automatic original feeding apparatus according to claim 2, further comprising a second discharge path for discharging the preceding original leaving said reading position.

4. A both-face automatic original feeding apparatus according to claim 1, wherein the original is held at a waiting position when a reverse rotation means is stopped.

5. A both-face automatic original feeding apparatus according to claim 4, wherein a path length extending from the tip end of the original at said waiting position to a junction between said surface reverse path and said introduction path is selected to become shorter than a length of the original in an original feeding direction.

6. A both-face automatic original feeding apparatus according to claim 4, further comprising a shifting means for shifting said reverse rotation means along said switch-back path, and wherein said shifting means changes a distance from a junction between said first discharge path and said switch-back path to said reverse rotation means in accordance with a length of the original in an original feeding direction.

7. A both-face automatic original feeding apparatus according to claim 1, further comprising a plurality of reverse rotation means dispersed along said switch-back path, and a moving means for moving said plurality of reverse rotation means independently toward and away from the original, and wherein said moving means selects the reverse rotation means to be moved, in accordance with a length of the original in an original feeding direction.

8. A both-face automatic original feeding apparatus according to claim 4, wherein a plurality of switch-back paths each having a reverse rotation means are provided, distances from a junction between said first discharge path and each of said switch-back paths to said respective reverse rotation means are differentiated from each other in accordance with a length of the original in an original feeding direction, and one of said plurality of switch-back paths is selectively used in accordance with the length of the original in the original feeding direction.

9. A both-face automatic original feeding apparatus according to claim 1, further comprising a detection means for detecting the tip end of the original supplied from said original stacking position to said reading position through said introduction path, and an adjust control means for adjusting re-supply timing for the original re-supplied from said switch-back path to said reading position through said surface reverse path, and wherein said adjust control means determines the re-supply timing for the original on the basis of an output from said detection means.

10. A both-face automatic original feeding apparatus according to claim 1, further comprising a one-face original discharge path for discharging an original having an image on a single surface.

11. A both-face automatic original feeding apparatus according to claim 1, further comprising a manual insertion original discharge path for discharging an original manually supplied to said reading position.

12. A both-face automatic original feeding apparatus according to claim 3, further comprising a discharge switch-back path disposed at a downstream side of said second discharge path, and a discharge reverse rotation means disposed in said discharge switch-back path.

13. A both-face automatic original feeding apparatus according to claim 12, further comprising a discharge shifting means for shifting said discharge reverse rotation means along said discharge switch-back path in accordance with a length of the original in an original feeding direction.

14. A both-face automatic original feeding apparatus according to claim 12, further comprising a plurality of discharge reverse rotation means disposed along said discharge switch-back path, and a moving means for moving said plural discharge reverse rotation means independently toward and away from the original, and wherein said moving means selects the discharge reverse rotation means to be moved, in accordance with a length of the original in an original feeding direction.

15. A both-face automatic original feeding apparatus according to claim 12, wherein a plurality of discharge switch-back paths each having a discharge reverse rotation means are provided, distances from a junction between said second discharge path and, each of said discharge switch-back paths to said respective discharge reverse rotation means are differentiated from each other in accordance with a length of the original in an original feeding direction, and one of said plurality of discharge switch-back paths is selectively used in accordance with the length of the original in the original feeding direction.

16. A both-face automatic original feeding apparatus according to claim 1, wherein a switching means is provided in said switch-back path, and said switch-back path also acts as a discharge path for a one-face original.

17. A both-face automatic original feeding apparatus according to claim 12, wherein a switching means is provided in said discharge switch-back path, and said discharge switch-back path also acts as a discharge path for a manually inserted original.

18. A both-face automatic original feeding apparatus according to claim 1, further comprising an additional introduction path exclusively used for a manually inserted original.

19. A both-face automatic original reading apparatus comprising:

a both-face automatic original feeding apparatus according to any one of claims 1 to 18; and an original reading means for reading the original at said reading position.

20. An image forming apparatus comprising:

a both-face automatic original feeding apparatus according to any one of claims 1 to 18;

an original reading means for reading the original at said reading position; and an image forming means for forming the images of the original read by said reading means on a sheet.

21. A method for controlling a both-face automatic original feeding operation, comprising the steps of:

a supplying step for directing an original supplied from an original stacking portion to a reading position;

a first surface reading step for reading a first surface of the original effected until the first surface of the original has just passed through said reading position;

a first discharging step for conveying the original to a waiting position after said first surface reading step;

a resupplying step for directing a tip end of the original re-supplied from said waiting position to said reading position;

a second surface reading step for reading a second surface of the original effected until the second surface of the original has just passed through said reading position; and a second discharging step for discharging the original after said second surface reading step;

wherein regarding the above-mentioned steps, during said first surface reading step for a given original, said resupplying step for a preceding original preceding to the given original is effected, and, during said second surface reading step for the preceding original, said first discharging step for the given original and said supplying step for a succeeding original following to the given original are effected, so that said first surface reading step for the given original and said second surface reading step for the preceding original are continuously effected alternately.

22. A method for controlling a both-face automatic original feeding operation according to claim 21, wherein, after said first surface reading step for a first original supplied from said original stacking portion, there is provided a skip time for directing the first original to a waiting position, and, during said skip time, said supplying step for a second original supplied from said original stacking portion is effected.

23. A both-face automatic original feeding apparatus wherein a plurality of originals having images on their first and second surfaces are successively supplied from an original stacking position to a reading position, and after the first surface of one of the plurality of originals passes through said reading position, a surface of the original is reversed through a switch-back path and then the original is re-supplied to said reading position, comprising:

an introduction path for directing the original supplied from said original stacking position to said reading position;

a first discharging path for directing the original to said switch-back path after the first surface of the original passes through said reading position;

a surface reverse path for directing the original from said switch-back path to said reading position while reversing a first surface and a second surface of the original; and a reverse rotation means disposed within said switch-back path for directing the original from said first discharge path to said switch-back path during normal rotation thereof and for supplying the original form a waiting position to said surface reverse path during reverse rotation thereof;

wherein a sum of a path length from said reading position to said reverse rotation means through said first discharging path and a path length from said reverse rotation means to said reading position through said surface reverse path is selected to become greater than twice of a length of the original in an original feeding direction, and a path length from a tip end in a switch-back direction of the original at the waiting position to a junction between said surface reverse path and said introduction path is selected to become shorter than the length of the original in the original feeding direction.

24. A both-face automatic original feeding apparatus wherein a plurality of originals having images on its first and second surfaces are successively supplied from an original stacking position to a reading position and, after the first surface of one of the plurality of originals passes through said reading position, a surface of the original is reversed through a switch-back path and then is re-supplied to said reading position, comprising:

an introduction path for directing the original supplied from said original stacking position to said reading position;

a first discharge path for directing the original to said switch-back path after the first surface of the original passes through said reading position;

a surface reverse path for directing the original from said switch-back path to said reading position while surface reversing the original; and a reverse rotation means disposed within said switch-back path for directing the original from said first discharge path to said switch-back path during normal rotation thereof and to supply the original to said surface reverse path during reverse rotation thereof.

* * * * *

UNITED STATES PATENT AND TRADEMARK OFFICE
CERTIFICATE OF CORRECTION

PATENT NO.   : 6,081,688

DATED        : June 27, 2000

INVENTOR(S)  : TAMOTSU OKADA, ET AL.

It is certified that error appears in the above-identified patent and that said Letters Patent is hereby corrected as shown below:

COLUMN 3:
   Line 57, "bothface" should read --both-face--.

COLUMN 5:
   Line 27, "(reffered" should read --referred--.

COLUMN 7:
   Line 64, "(Further," should read --Further,--.

COLUMN 9:
   Line 63, "$D_2$ not act" should read --$D_2$ and do not act--.

COLUMN 11:
   Line 59, "to" (first occurrence) should be deleted.

COLUMN 12:
   Line 67, "the" should read --an--; and "an" should read --the--.

UNITED STATES PATENT AND TRADEMARK OFFICE
CERTIFICATE OF CORRECTION

PATENT NO. : 6,081,688

DATED : June 27, 2000

INVENTOR(S) : TAMOTSU OKADA, ET AL.

It is certified that error appears in the above-identified patent and that said Letters Patent is hereby corrected as shown below:

```
COLUMN 13:
   Line 2, "the" (first occurrence) should read --a--.
   Line 3, "the" should read --an--.
```

Signed and Sealed this

Seventeenth Day of April, 2001

Attest:

NICHOLAS P. GODICI

*Attesting Officer*  Acting Director of the United States Patent and Trademark Office